(12) United States Patent
Bluger et al.

(10) Patent No.: US 8,219,544 B2
(45) Date of Patent: Jul. 10, 2012

(54) METHOD AND A COMPUTER PROGRAM PRODUCT FOR INDEXING FILES AND SEARCHING FILES

(75) Inventors: Michael Bluger, Modiin (IL); Nadav Golbandi, Karkur (IL); Nadav Y. Har'el, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 12/049,393

(22) Filed: Mar. 17, 2008

(65) Prior Publication Data
US 2009/0234809 A1 Sep. 17, 2009

(51) Int. Cl.
G06F 7/08 (2006.01)
G06F 17/30 (2006.01)

(52) U.S. Cl. .................. 707/711; 707/741; 707/715

(58) Field of Classification Search ....... 707/1, 999.001, 707/715, 741, 5, 10, 999.005, 999.01, 673, 707/711, 3, 102, 999.003, 999.102, 716, 707/999.107; 709/229
See application file for complete search history.

(56) References Cited

U.S. PATENT DOCUMENTS

| | | | |
|---|---|---|---|
| 7,130,841 B1 | 10/2006 | Goel et al. | |
| 2002/0083053 A1 | 6/2002 | Richard et al. | |
| 2002/0188735 A1* | 12/2002 | Needham et al. | 709/229 |
| 2004/0205046 A1 | 10/2004 | Cohen et al. | |
| 2005/0166082 A1 | 7/2005 | Williams et al. | |
| 2005/0198299 A1* | 9/2005 | Beck et al. | 709/226 |
| 2006/0004717 A1* | 1/2006 | Ramarathnam et al. | 707/3 |
| 2006/0059178 A1 | 3/2006 | Baron et al. | |
| 2008/0183680 A1* | 7/2008 | Meynier et al. | 707/3 |
| 2009/0164475 A1* | 6/2009 | Pottenger | 707/10 |
| 2010/0128935 A1* | 5/2010 | Filley et al. | 382/113 |
| 2010/0211571 A1* | 8/2010 | Prahlad et al. | 707/741 |

OTHER PUBLICATIONS

Andrei Z. Broder et al., "Indexing Shared Content in Information Retrieval Systems". In EDBT '06. 313-330.

* cited by examiner

*Primary Examiner* — James Trujillo
*Assistant Examiner* — Bruce Moser

(57) ABSTRACT

A method and a computer program product for indexing files, the method includes: generating, by a remote indexing entity, user consolidated files indexing information representative of content of user files that are stored in either one of a user machine and in at least one server.

16 Claims, 3 Drawing Sheets

METHOD AND A COMPUTER PROGRAM PRODUCT FOR INDEXING FILES AND SEARCHING FILES

FIELD OF THE INVENTION

The present invention relates to methods and computer program products for indexing files and for searching files.

BACKGROUND OF THE INVENTION

A desktop search application allows a user to search user files stored on the user computer. This search is based upon an index that is generated by the desktop search application. Commercially available desktop search applications include, for example,
"Google Desktop Search" of Google Inc., "Microsoft Windows Desktop Search" of Microsoft Inc., "Copernic Desktop Search" of Copernic Inc., "Yahoo! Desktop Search" of Yahoo! Inc., and "X1 Desktop Search" of X1 technologies Inc.

Many desktop search applications are executed by the user computer and are limited to user files that are stored on the user computer. Accordingly, desktop search applications require the user to access his computer and can not provide information about user files that are stored in a remote computer (such as a mail server, a shared network server and the like).

In addition, user desktop applications consume a relatively large amount of the memory and/or processing resources of the user computer. Accordingly, a desktop search application can be impractical if the user computer has limited resources (for example—the user computer is a Personal Digital Assistant), or if the user computer can allocate only limited resources to the desktop search application.

There is a growing need in providing efficient file indexing and file searching methods, systems, and computer program products.

SUMMARY

A method for indexing files, the method includes: generating, by a remote indexing entity, user consolidated files indexing information representative of content of user files that are stored in either one of a user machine and in at least one server.

Conveniently, the method includes generating, by the remote indexing entity, the user consolidated files indexing information representative of user files that are stored in either one of the user machine, in at least one shared network server, in a mail server and in at least one backup server.

Conveniently, the method includes generating an index from user consolidated files indexing information of multiple users; wherein the generating comprises removing redundant indexing information.

Conveniently, the method includes generating an index for a sub group of users; wherein the sub group of users is defined based upon expected file retrieval patterns of users.

Conveniently, the method includes generating an index for a sub group of users and dynamically changing the sub group of users in response to files utilized by the users.

Conveniently, the method includes splitting an index to multiple indices in response to a storage limitation.

Conveniently, the method includes storing the user files at a remote storage unit accessible by the remote indexing entity regardless of a state of at least one source of at least one user device.

Conveniently, the method includes generating an index for each set of files in response to a content of the files.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
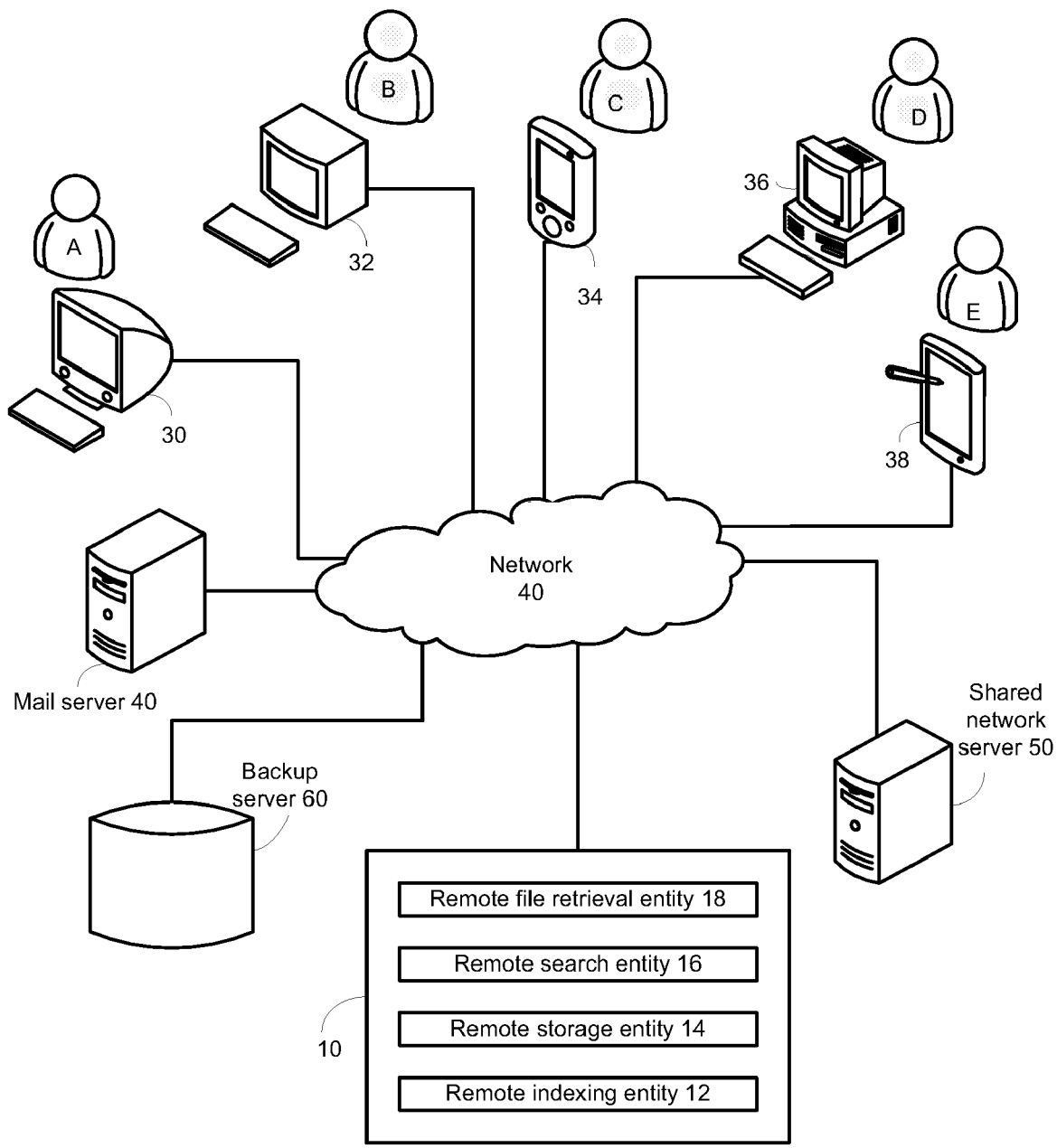
FIG. 1 illustrates a system and its environment according to an embodiment of the invention.

The term "user machine" refers to any computer or virtual machine that is locally accessed by a user. A user machine can be a user computer such as a laptop computer, a desktop computer, a Personal Digital Assistant (PDA), a mobile phone, a media player, a working station. A user machine can a virtual machine hosted by a user computer. A user machine is locally accessed in the sense that the user can directly interface with the user machine or directly interface with an input/output component of associated with the user machine. For example, a user machine includes a computer that has a wireless keyboard or other wirelessly connected input/output device. It is noted that the user machine can be shared by multiple users. It is further noted that a single user can have multiple user machines.

The term "user file" refers to files (such as documents) that can be accessed by the user. A user file can be a non-shared file of the user (also known as a private file), a file shared by certain users, and a file accessible to anyone.

The term "indexing information" refers to information that is generates in order to ease finding of information associated with a file. A typical index includes information relation to a presence of key terms in a file.

Conveniently, systems, method and computer program products are provided. A remote indexing entity generates user consolidated files indexing information that represent the content of user files that are stored in a user machine, and user files stored at one or more remote servers. The user consolidated files indexing information can represent the content of all the user files but this is not necessarily so.

Conveniently, a remote search entity performs a file search in response to a user query and in response to the content of the user consolidated files indexing information.

The remote search entity and the remote indexing entity can be included in a single computerized entity.

According to an embodiment of the invention a user consolidated files indexing information can be arranged in a user consolidated files index. According to other embodiments of the invention a single index can include user consolidated files indexing information (or at least a portion of user consolidated files indexing information) that relate to multiple users.

The generation of an index involves removing redundant information. For example, if a user files is stored at the user computer, and is stored at a mail server then indexing information relating to this file is not duplicated. Yet for another example, if a certain index includes indexing information relating to users that share one or more files then indexing information relating to that file is not duplicated.

According to an embodiment of the invention, a single index is generated for all users. According to another embodiment of the invention, an index is generated per a sub group of users (out of a group of users).

According to another embodiment of the invention the remote indexing entity generates indexing information representative of files of multiple users and partitions the indexing information (to provide multiple indices) based upon contents of the files. Each such index includes at least a portion of a user consolidated files indexing information.

The user files can be retrieved from user machines or from one or more remote servers such as but not limited to backup servers, mail servers, shared network servers (such as network file systems).

Conveniently, utilizing a remote indexing entity to generate user consolidated files indexing information and using a remote search entity to perform a search is conveniently characterized by the following: (i) user machine resources are not allocated for indexing files or for searching files; (ii) there is no need to install an indexing software and/or a searching software on the user machine; (iii) removing redundant information during an indices merging operation can save storage space, especially when a large number of files are shared between multiple users; (iv) a user can search for his files from many locations and is not required to access his own computer; (v) a user can search a user file that originally resides in a computerized entity that is turned off of is otherwise inaccessible; (vi) a user can give other people permission to search his files (which is useful, for example, when an employee goes on vacation and is temporarily replaced by another employee); (vii) advanced ranking and faceted search capabilities can be applied by the remote search entity; (viii) knowledge of multiple users files enables to personalize the search. The personalization can utilize the storage of the user files at a single remote storage entity. This eases an analysis of user file retrieval patterns and of a creation of a user profile, whereas the user profiles can be used for various purposes including but not limited to expert finding, advertisement targeting, and content personalization. For example, if the files of the user indicate that the user is interested in cars then when the user searched for a "Jaguar" the server will appreciate that the user refers to the car and not to the wild animal.

FIG. 1 illustrates system 10 and its environment according to an embodiment of the invention.

System 10 includes remote indexing entity 12, remote storage entity 14, remote search entity 16, and remote user file retrieval entity 18. For simplicity of explanation, these entities are illustrated as located near to each other.

Those of skill in the art will appreciate that different entities (out of entities 12, 14, 16 and 18) can be located in different locations and that each of said entities can reside on multiple servers. For example, user files and additionally or alternatively different indices can be stored in different remote storage entities.

Yet for another example user files can be stored at remote storage units that differ from the remote storage units that store user consolidated files indexing information.

Those of skill in the art will appreciate that each of these entities (12, 14, 16, and 18) can be implemented by software, hardware, middleware, firmware of a combination thereof.

System 10 can include multiple remote indexing units, multiple remote storage units, multiple remote search units and, additionally or alternatively, multiple remote user file retrieval units.

System 10 can be characterized by a centralized architecture, by a distributed architecture and can include a mesh of units that are characterized by a high parallelism degree.

System 10 is connected via one or more networks such as network 20 to user machines 30, 32, 34, 36 and 38, to mail server 40, to share network server 50 and to backup server 60. It is noted that system 10 can be connected, directly or indirectly, to these servers via different connections and that only some of these servers can exist or be connected to system 10.

User machine 30 is accessed by user A, user machine 32 is accessed by user B, user machine 34 is accessed by user C, user machine 36 is accessed by user D and user machine 38 is accessed by user E.

It is noted that system 10 can support more and even much more than three users. Typically, the storage space saving statistically increases as the number of users increases.

According to various embodiments of the invention remote indexing entity 12 can generate one index per user (user consolidated files index), one index per all users, generate a merged index per a sub group of users out of a group of users or generate an index per a set of user files based upon the content of the files.

Generating an index (so called a user consolidated files index) per user is characterized by the following: (i) simple to implement, (ii) efficient during search as only the user own files need to be considered as search matches; (iii) eases access-control during search as only a user's own user consolidated files index is searched, (iv) eases user consolidated files index update; (v) allows system 10 to scale in an almost seamless manner; (vi) easy to deploy on system 10 even if system 10 is characterized by a distributed architecture. If, for example, system 10 includes a cluster (or mesh) of remote storage units a user consolidated files index is small enough to be stored at a single remote storage unit.

An index that includes user consolidated files indexing information (or a portion thereof) relating to files of a plurality of users is also referred to as a merged index. A merged index can include user consolidated files indexing information of all user or of some users. The merged index can be generated in various manners such as but not limited to merging user consolidated files indices, merging user consolidated files indexing information, or merging portions of user consolidated files indexing information of files (if the content of these files) fulfills a certain condition.

Generating a single index for all users involves removing redundant information and accordingly is very efficient in terms of storage space as indexing information relating to a certain file (even if shared by multiple users) is stored once. This prevents the duplication of indexing information of files shared by multiple users. Indexing information of files that are shared by multiple users will be associated with meta-data reflecting the users associated with the file.

Access control during a file search process (such as method 300 of FIG. 3) can be implemented by limiting a search result to files that can be accessed by a user. This can include generating a data structure of documents that can be accessed by the user or by otherwise applying constraints on the search process. A query Q from user A can for cause remote search entity 16 find an intersection of files which match query Q and are allowed to be accessed by user A (the accessibility can be indicated by an access field associated with the file).

Generating multiple indices can provide a trade-off between the mentioned above solutions. Multiple indices will inhibit some space reduction benefits and will also simplify the update and storage of these indices. It can be beneficial to merge indexing information that will reduce the size of the indices. If for example, certain users share a large amount of files their user consolidated file indices should be merged.

According to an embodiment of the invention the merger is based upon the identity of the users. The identity of these users can be determined in advance, can be updated in response to file retrieval by users or can be determined by a combination of both.

For example, remote indexing entity 12 can try to estimate in advance, with which other users a new user is likely to be sharing files. This can be done, for example, by looking at a users' configuration, files, or position in the organization.

Yet for another example, remote indexing entity 12 can apply a dynamic merging and splitting process. The merging can be progressive and be responsive to files that are shared by users. If user A and user B start to share many files their user consolidated files indices can be consolidated. If these users (A and B) stop to share files and user C starts to share files with user A and not with user B then the merged index of users A and B can be split and a new merged index (of users A and C) can be created.

It is further noted that an index can be split due to storage limitations. It is expected that as new files are added the size of a merged index will continuously grow. When the index reaches a certain storage limitation (for example—if the merged index can not be stored in a single remote storage unit of remote storage entity 14) then it can be split. The splitting can be performed such as to minimize the sizes of the resulting indices.

According to another embodiment of the invention the merger of indexing information is based upon the content of the files. An index is provided for each file that its content fulfills a certain condition. This embodiment can involve storing different portions of user consolidated files indexing information at different indices.

Conveniently, each file can be processed (for example by applying a checksum function or a hashing function) to provide a file content value (or key). A certain index will include indexing information of files that their file content value fulfills the certain condition. The conditions can be static or can be dynamically updated. The dynamic update can be responsive to the size of different merged indices. For example, indexing information of files whose checksum is even are included in a first merged index while indexing information of files whose their checksum is even are included in another index.

It is noted that at a given point in time remote storage entity 14 can store indices of a certain type (for example—only a user consolidated files index or only merged indices) but it can also store a combination thereof.

Conveniently, at a given point in time a single indices merging policy (based upon users or based upon file content) is applied.

The indexing by remote indexing entity 12 is preceded by fetching user files (to be indexed) by the remote file retrieval entity 18.

Remote file retrieval entity 18 can be a crawler. US patent application US 20060059178A1 titled "Electronic mail indexing systems and methods" illustrates a crawler that can retrieve different types of user files. Commercially available desktop search tools utilize crawlers to fetch files of different types that reside on a user computer.

Remote file retrieval entity 18 can be integrated with a backup server or can intercept file backup processes. US patent application 25166082A1 titled "Method and apparatus for searching backup data based upon content and attributes" illustrates a system and method for intercepting files sent to a backup storage.

Remote file retrieval entity 18 can retrieve user files that are stored in a remote server either directly (from the server) or indirectly (via the user machine). It is noted that fetching these files via the user machine can be less efficient but more secure as the remote file retrieval entity 18 is not provided with access information (such as user passwords).

Remote storage entity 14 can store indexing information. It can also store the files that were indexed, and additionally or alternatively store representation of user files. A file representation can be a non-editable version of a user file, a compressed representation of a user file, a text version of the user file, an encrypted or a partially encrypted version of the user file. A user file and, additionally or alternatively, a user file representation can be sent to a user as a result of a file search session.

A typical file search session starts by receiving a query from a user. Remote search entity 16 responds to the user query by searching one or more indices stored in remote storage entity 14 and providing a response that includes matching file information (such as file name, file size, modification data, file location, link to file) for each file that matched the query (if such a matching file exist).

The user can then request to retrieve a matching file in order to view it and even modify it.

System 10 can respond to that request in different manners (or by providing a combination thereof): (i) sending the matching file to the user, (ii) sending a representation of the matching file to the user or (iii) opening the file on the user computer. It is noted that system 10 can condition any of these responses by a fulfillment of a security condition. Thus, the user can be requested to undergo a user identification process, a user verification process and the like.

It is noted that the response can be responsive to the location of the user—if the user sends the request by using the same entity (user computer, remote server) that stores the file then the user can receive the file, else—the user receives only a version of the file. This version can be a non-editable version of the matching file. This approach can bypass security policies that ignore links from a Web page (http:///) to a local file (file:///).

Conveniently, system can provide a direct link to a (so called original) user file (stored in system 10), or an indirect link to a representation of the user file. Alternatively, system 10 can provide peer to peer information that will enable a requesting device to access the device (user computer or shared entity that does not belong to system 10) that stores the original file.

Figure 2:
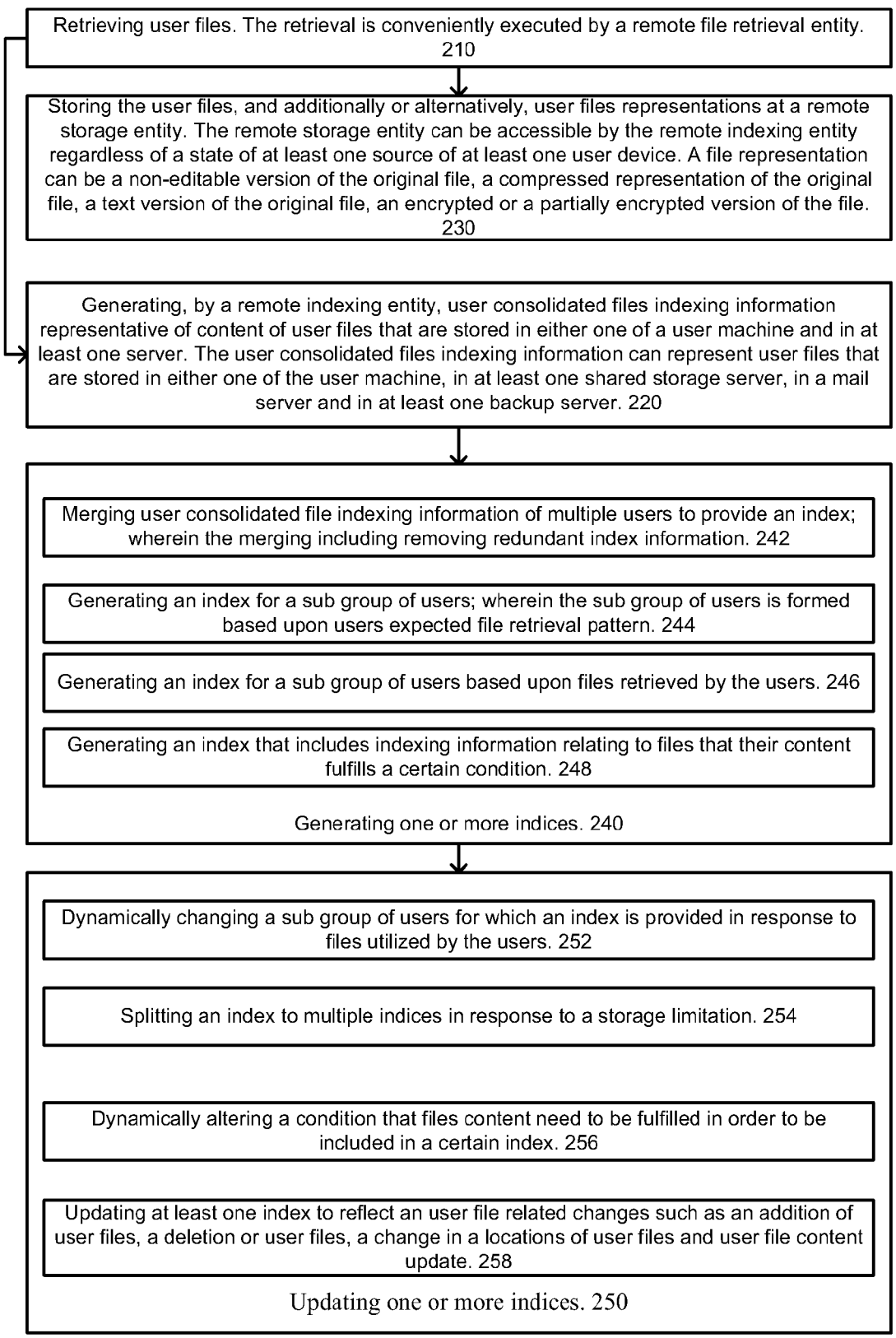
FIG. 2 is a flow chart of a method for indexing files according to an embodiment of the invention.

FIG. 2 illustrates method 200 for indexing files, according to an embodiment of the invention.

Method 200 starts by stage 210 of retrieving user files.

The retrieval is conveniently executed by a remote file retrieval entity. Stage 210 can include retrieving files using a crawler, retrieving files via a user computer, directly retrieving files from a server that stores the files, intercepting a backup process, retrieving user files by a remote file retrieval entity that is a part of a backup server.

Stage 210 is followed by stage 220 and, additionally or alternatively, by stage 230. FIG. 2 illustrates both stages 220 and 230.

Stage 220 includes generating, by a remote indexing entity, user consolidated files indexing information representative of content of user files that are stored in either one of a user machine and in at least one server.

The user consolidated files indexing information can represent user files that are stored in either one of the user machine, in at least one shared network server, in a mail server and in at least one backup server.

Stage 230 includes storing the user files, and additionally or alternatively, user files representations at a remote storage entity. The remote storage entity can be accessible by the remote indexing entity regardless of a state of at least one source of at least one user device. A file representation can be a non-editable version of the original file, a compressed representation of the original file, a text version of the original file, an encrypted or a partially encrypted version of the file.

Stage 220 can be followed by stage 240 of generating one or more indices.

Stage 240 can include at least one of the following or a combination thereof: (i) merging user consolidated file indexing information of multiple users to provide an index; wherein the merging including removing redundant index information; (ii) generating an index for a sub group of users; wherein the sub group of users is formed based upon users expected file retrieval pattern; (iii) generating an index for a sub group of users based upon files retrieved by the users; (iv) generating an index that includes indexing information relating to files that their content fulfills a certain condition.

Stage 240 is followed by stage 250 of updating one or more indices.

Stage 250 can include at least one of the following stages or a combination thereof; (i) stage 252 of dynamically changing a sub group of users for which an index is provided in response to files utilized by the users; (ii) stage 254 of splitting an index to multiple indices in response to a storage limitation; (iii) stage 256 of dynamically altering a condition that files content need to be fulfilled in order to be included in a certain index; and (iv) stage 258 of updating at least one index to reflect an user file related changes such as an addition of user files, a deletion or user files, a change in a locations of user files and user file content update.

Figure 3:
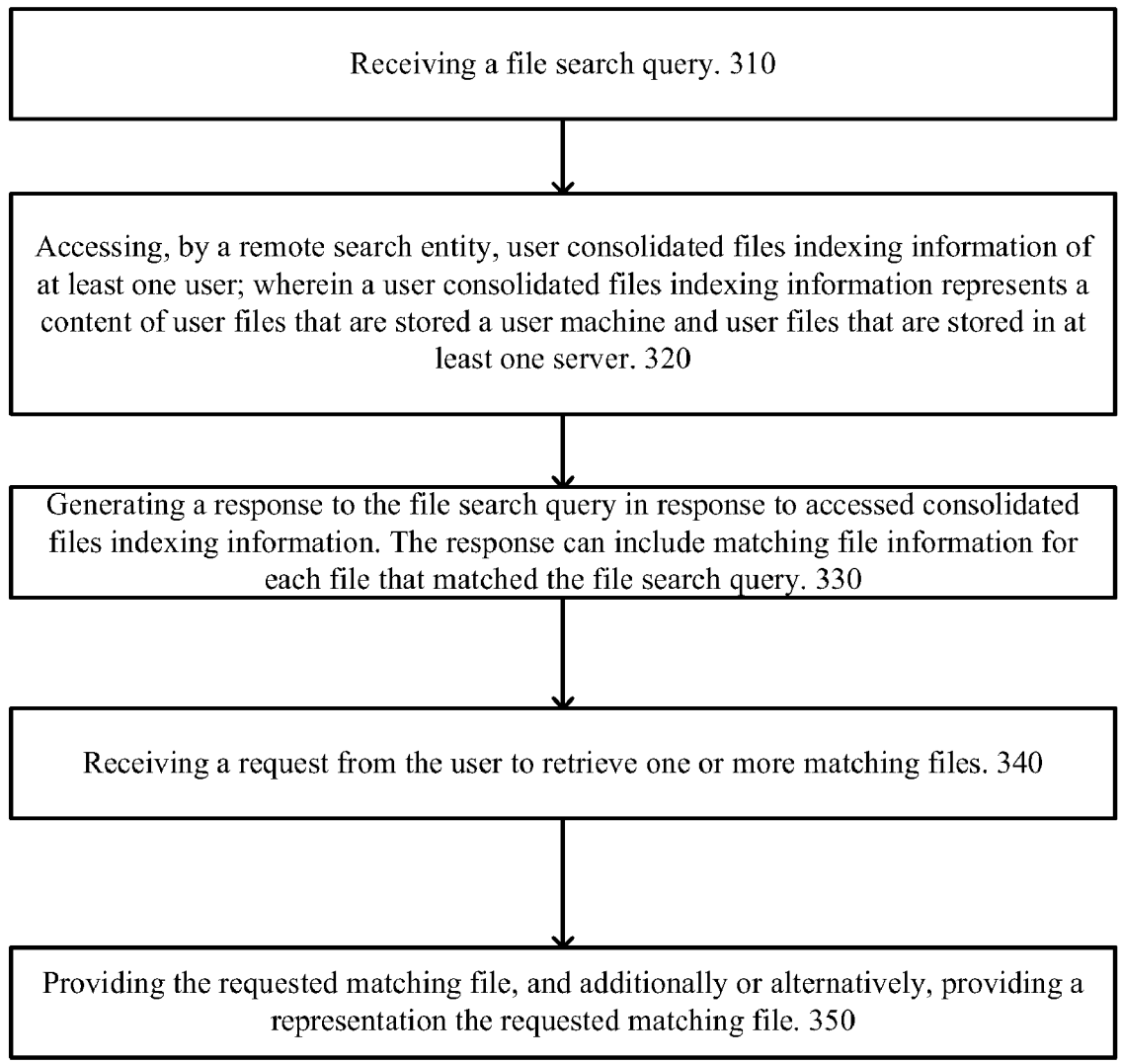
FIG. 3 is a flow chart of a method for searching files according to an embodiment of the invention.

FIG. 3 illustrates method 300 for, according to an embodiment of the invention.

Method 300 starts by stage 310 of receiving a file search query.

Stage 320 is followed by stage 330 of accessing, by a remote search entity, user consolidated files indexing information of at least one user; wherein a user consolidated files indexing information represents a content of user files that are stored a user machine and user files that are stored in at least one server.

Stage 330 is followed by stage 340 of generating a response to the file search query in response to accessed consolidated files indexing information. The response can include matching file information for each file that matched the file search query.

Stage 340 can be followed by stage 350 of receiving a request from the user to retrieve one or more matching files.

Stage 350 can be followed by stage 360 of providing the requested matching file, and additionally or alternatively, providing a representation the requested matching file.

It is noted that system 10 can execute either one of methods 100 and 200 or a combination thereof.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The program code of the medium can be read by utilizing electronic reading techniques, magnetic reading techniques, optical reading techniques, electromagnetic reading techniques, or infrared reading techniques. The medium can be a semiconductor system (or apparatus or device). Non-limiting examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently, a computer program product is provided. The computer program product includes a computer usable medium that includes a computer readable program, wherein the computer readable program when executed on a computer causes the computer to receive information representative of media stream commands generated by multiple users while viewing a media stream; and segment the media stream to media stream segments in response to the received information.

Conveniently, a computer program product is provided. The computer program product includes a computer usable medium that includes a computer readable program, wherein the computer readable program when executed on a computer causes the computer to calculate, for each user out of multiple users and in response to media stream commands generated by the user, a user viewing value; wherein the user viewing value represents a relative part of the media stream viewed by the user; and determine an interest value of the media stream in response to user viewing values of each of the multiple users.

The computer readable program can cause the computer to execute one or more states of any method out of methods 200 and 300.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:
1. A method for indexing files, the method comprising:
coupling a remote indexing system to communicate over a network with a plurality of user machines, which are associated with respective users and contain user files;
generating on the remote indexing system multiple user-consolidated file indices for the users, each user-consolidated file index containing indexing information with respect to the user files belonging to a respective user;
forming multiple sub-groups of the users responsively to sharing of the files among the users;

merging at least portions of the user-consolidated file indices of the users in the multiple sub-groups to generate multiple, respective merged indices for use by the users in the multiple sub-groups;

accepting queries sent over the network to the remote indexing system from multiple, different users in the multiple sub-groups to search the indexing information on the remote indexing system, wherein the queries are accepted from the user machines and the responses are transmitted to the user machines without using user machine resources to index or search files; and transmitting responses from the remote indexing system to each of the different users with respect to the user files belonging to the respective user.

2. The method according to claim 1, wherein the indexing information in each of the user-consolidated file indices represents the files of the respective user that are stored on the user machine that is associated with the respective user.

3. The method according to claim 2, wherein the indexing information in each of at least some of the user-consolidated file indices represents further files of the respective user that are stored on a remote server.

4. The method according to claim 2, and comprising accepting a query from one of the users that is submitted to the remote indexing system from a remote machine other than the user machine that is associated with the one of the users, and providing access to the one of the users, in response to the query, to the indexing information with respect to the user files on the user machine.

5. The method according to claim 1, wherein merging at least the portions of the user-consolidated file indices comprises removing redundant information from the merged index.

6. The method according to claim 1, and comprising, after forming the multiple sub-groups, adding and removing the users to and from the multiple sub-groups in response to changes in the retrieval patterns of the users, and modifying the merged index responsively to the adding and removing of the users.

7. The method according to claim 1, wherein merging at least the portions of the user-consolidated file indices comprises adding further files to the merged index, and wherein the method comprises splitting the merged index into multiple smaller indices when a size of the merged index exceeds a certain storage limitation.

8. The method according to claim 1, wherein transmitting the responses comprises searching on the remote indexing system, for each of the different users, only the user files belonging to the respective user.

9. A computer program product, comprising a non-transitory computer-usable medium in which a computer-readable program is stored, wherein the program, when executed by a computer, causes the computer to communicate over a network with a plurality of user machines, which are associated with respective users and contain user files, and to generate multiple user-consolidated file indices for the users, each user-consolidated file index containing indexing information with respect to the user files belonging to a respective user, and wherein the instructions cause the computer to form multiple sub-groups of the users responsively to sharing of the files among the users, and to merge at least portions of the user-consolidated file indices of the users in the multiple sub-groups to generate multiple, respective merged indices for use by the users in the multiple sub-groups, and wherein the instructions cause the computer to accept queries sent over the network to the remote indexing system from multiple, different users in the multiple sub-groups to search the indexing information on the remote indexing system, wherein the queries are accepted from the user machines and the responses are transmitted to the user machines without using user machine resources to index or search files, and to transmit responses from the remote indexing system to each of the different users with respect to the user files belonging to the respective use.

10. The product according to claim 9, wherein the indexing information in each of the user-consolidated file indices represents the files of the respective user that are stored on the user machine that is associated with the respective user.

11. The product according to claim 10, wherein the indexing information in each of at least some of the user-consolidated file indices represents further files of the respective user that are stored on a remote server.

12. The product according to claim 10, wherein the instructions cause the computer to accept a query from one of the users that is submitted to the remote indexing system from a remote machine other than the user machine that is associated with the one of the users, and to provide access to the one of the users, in response to the query, to the indexing information with respect to the user files on the user machine.

13. The product according to claim 9, wherein the instructions cause the computer to remove redundant information from the merged index.

14. The product according to claim 9, wherein the instructions cause the computer, after forming the multiple sub-groups, to add and remove the users to and from the multiple sub-groups in response to changes in the retrieval patterns of the users, and to modify the merged index responsively to having added and removed the users.

15. The product according to claim 9, wherein the instructions cause the computer to add further files to the merged index, and to split the merged index into multiple smaller indices when a size of the merged index exceeds a certain storage limitation.

16. The product according to claim 9, wherein the instructions cause the computer to search on the remote indexing system, for each of the different users, only the user files belonging to the respective user.

* * * * *